(12) United States Patent
French et al.

(10) Patent No.: US 7,613,188 B1
(45) Date of Patent: Nov. 3, 2009

(54) ETHERNET VLL SPOKE TERMINATION AT AN IP INTERFACE

(75) Inventors: Mark French, Bucks (GB); Martin Lea, Bucks (GB); Joseph M. Regan, Pleasanton, CA (US)

(73) Assignee: Alcatel Lucent, Paris (FR)

( * ) Notice: Subject to any disclaimer, the term of this patent is extended or adjusted under 35 U.S.C. 154(b) by 472 days.

(21) Appl. No.: 11/414,726

(22) Filed: Apr. 27, 2006

(51) Int. Cl.
*H04L 12/28* (2006.01)
(52) U.S. Cl. .................................. 370/392; 370/400
(58) Field of Classification Search .................. None
See application file for complete search history.

(56) References Cited

U.S. PATENT DOCUMENTS 6,526,056 B1 * 2/2003 Rekhter et al. .............. 370/392
2002/0067725 A1 * 6/2002 Oguchi et al. .............. 370/390
2003/0108041 A1   6/2003 Aysan et al.
2003/0189898 A1 * 10/2003 Frick et al. .................. 370/227
2004/0017816 A1   1/2004 Ishwar et al.
2006/0013142 A1 * 1/2006 Hongal et al. .............. 370/248

FOREIGN PATENT DOCUMENTS

EP       1 585 263       10/2005

* cited by examiner

*Primary Examiner*—Pankaj Kumar
*Assistant Examiner*—Eunsook Choi
(74) *Attorney, Agent, or Firm*—Van Pelt, Yi & James LLP

(57) ABSTRACT

Ethernet VLL spoke termination at an IP interface is disclosed. A packet including an address associated with a remote host is received at an interface. A routing next hop information required to route the packet to the remote host at a far end of a pseudo-wire via which connectivity to the remote host is provided and an intermediate next hop information required to send the packet to the far end via the pseudo-wire are determined in a single forwarding stage, based at least in part on the interface and the address.

20 Claims, 8 Drawing Sheets

ETHERNET VLL SPOKE TERMINATION AT AN IP INTERFACE

BACKGROUND OF THE INVENTION

Multi-protocol label switching (MPLS)-based virtual lease lines (VLL) and other transparent tunneling mechanisms (e.g., TLS) have been provided. In some implementations, Martini encapsulation is used to tunnel customer Ethernet frames between customer sites, through an MPLS provider backbone, in a manner that is largely transparent to the customer, in the sense that hosts at two or more sites appear to one another to be connected to and accessible via a local area network. Typically, MPLS tunnels known as label switched paths (LSP) are used. A VLL (sometimes referred to herein as a "pseudo-wire") is provided in some cases by establishing a unidirectional virtual circuit in each direction between customer sites. An LSP may be configured to carry traffic associated with multiple virtual circuits. Payload data, such as customer Ethernet frames, is encapsulated in part by adding to the payload an MPLS label stack that includes an LSP tunnel label to be used to transport the payload through the MPLS backbone and a VC label to be used at the far end, e.g., by a far end provider edge router, to associate the payload with an outbound port or other interface.

It is desirable to provide IP connectivity to a remote Ethernet host/router without requiring IP inter-working, i.e., without requiring that routing decisions be made at the far end, e.g., at the far end provider edge router (e.g., ARP cache or routing table). To achieve this goal, any routing decisions must be made at the ingress (near) end. To provide IP connectivity to a remote Ethernet host/router without requiring IP inter-working, therefore, it is necessary to make at the near end any routing decisions necessary to form the Ethernet (or other Layer 2) header that will be required at the far end to reach, without making an IP routing decision at that far end, the IP routing next hop for the payload (e.g., IP packet). Typical prior art routers require a two step process (e.g., one to derive next hop for remote host Ethernet encapsulation and the other to determine the next hop to reach the pseudo-wire) with an external network communication between the two steps. In one approach, a sending host sends an IP packet intended for a far end destination to a router, which adds the IP routing next hop information. The router sends the packet via a network interface to a separate provider edge router that adds the intermediate next hop (LSP/VC) header information and sends the packet via an interface to the LSP. In another approach, the functions of the router and provider edge router described above are integrated into a single physical system, but a separate external network communication between the separate routing processes running in the same physical system is required to perform all of the routing required to forward the packet via the pseudo-wire and have it arrive at the other end with all of the information required to route it to its destination (which may be the ultimate destination or an intermediary like a bridge or router).

Therefore, a way is needed to provide IP connectivity to a remote Ethernet host/router across an Ethernet pseudo-wire without requiring IP inter-working on the far end device and in a in a single forwarding stage while allowing the pseudo-wire to dynamically converge its immediate next hop.

BRIEF DESCRIPTION OF THE DRAWINGS

Various embodiments of the invention are disclosed in the following detailed description and the accompanying drawings.

DETAILED DESCRIPTION

The invention can be implemented in numerous ways, including as a process, an apparatus, a system, a composition of matter, a computer readable medium such as a computer readable storage medium or a computer network wherein program instructions are sent over optical or electronic communication links. In this specification, these implementations, or any other form that the invention may take, may be referred to as techniques. A component such as a processor or a memory described as being configured to perform a task includes both a general component that is temporarily configured to perform the task at a given time or a specific component that is manufactured to perform the task. In general, the order of the steps of disclosed processes may be altered within the scope of the invention.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Ethernet VLL spoke termination at an IP interface is disclosed. In some embodiments, the remote next hop for Ethernet encapsulation and VLL pseudo-wire dynamic next hop are determined in a single forwarding decision, made at ingress to the provider edge router, providing Ethernet pseudo-wire connectivity to a remote Ethernet attached subnet. An IP packet from a sending host arrives at the provider edge router at an interface associated with a routing instance. At egress, one or more lookups are performed to obtain all of the information required to form for the packet in a single forwarding stage both an IP next hop header and an encapsulation header (e.g., MPLS label stack including a tunnel label and a VC label associated with a pseudo-wire with which the packet is associated). In some embodiments, the far end destination host, the IP address of which is the destination IP address of the packet received from the sending host, is associated with a virtual IP interface at the ingress PE, which knows to forward associated IP traffic via the LSP/pseudo-wire.

Figure 1A:
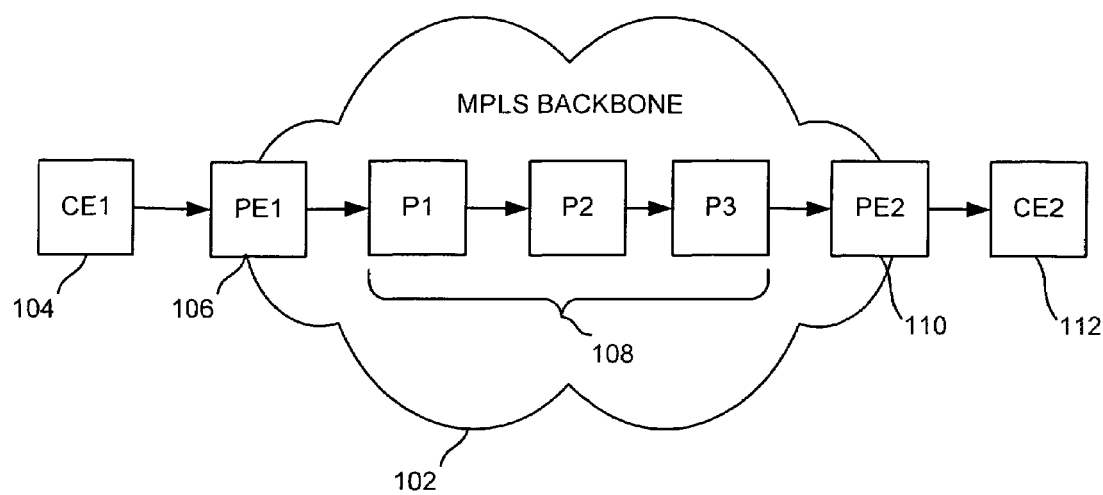
FIG. 1A is a block diagram illustrating an embodiment of a provider network and associated elements.

FIG. 1A is a block diagram illustrating an embodiment of a provider network and associated elements. In the example shown, MPLS backbone 102 is used to provide IP connectivity between hosts (not shown) associated with a near end customer edge (CE) device 104 and hosts (not shown) associated with a far end customer edge device 112. In the example shown, IP traffic from hosts associated with CE 104, labeled "CE1" in FIG. 1, to hosts associated with CE 112, labeled "CE2", is tunneled through MPLS backbone 102 through a label switched path (LSP) provided by near end provider edge (PE) router 106, labeled "PE1" in FIG. 1, core provider routers 108, labeled "P1", "P2", and "P3" in FIG. 1, and a far end (egress) provider edge router PE 110, labeled "PE2".

Figure 1B:
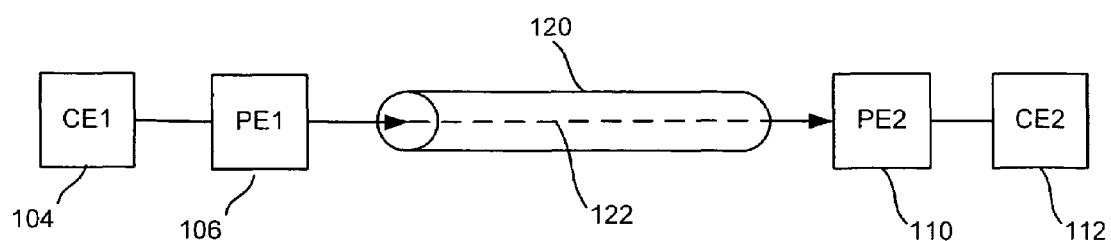
FIG. 1B is a block diagram that represents the provider network and associated elements of FIG. 1A in way that highlights the manner in which IP connectivity is provided through the MPLS backbone.

FIG. 1B is a block diagram that represents the provider network and associated elements of FIG. 1A in way that highlights the manner in which IP connectivity is provided through the MPLS backbone. As shown in FIG. 1B, traffic received at PE 106 from CE 104 is transported via a label switched path (LSP) 120, provided in the example shown in FIGS. 1A and 1B by PE 106, core routers 108, and egress PE 110. A virtual circuit 122 is defined to permit traffic associate with CE 104 and CE 112 to be distinguished form other traffic transported via the LSP 120. In some embodiments, Martini encapsulation is used. An Ethernet (or other) frame desired to be delivered to a host associated with far end CE 112, e.g., an Ethernet frame having an IP packet as its payload for which the Ethernet destination host is the IP routing next hop, is encapsulated using an MPLS label stack that includes a tunnel label associated with LSP 120 and a VC label associated with VC 122. On receipt at the far end, PE 110 removes the VC label (the penultimate router in the MPLS backbone omits the tunnel label), associates the Ethernet frame with an outbound port based at least in part on the VC label, and sends the Ethernet frame out the identified outbound port. While communication in just one direction is shown in FIGS. 1A and 1B, typically two way connectivity is provided. Since an LSP is unidirectional, in the example shown connectivity from CE 112 to CE 104, e.g., would be provided by a different LSP, using a VC associated with CE 112 and CE 104.

Figure 2:
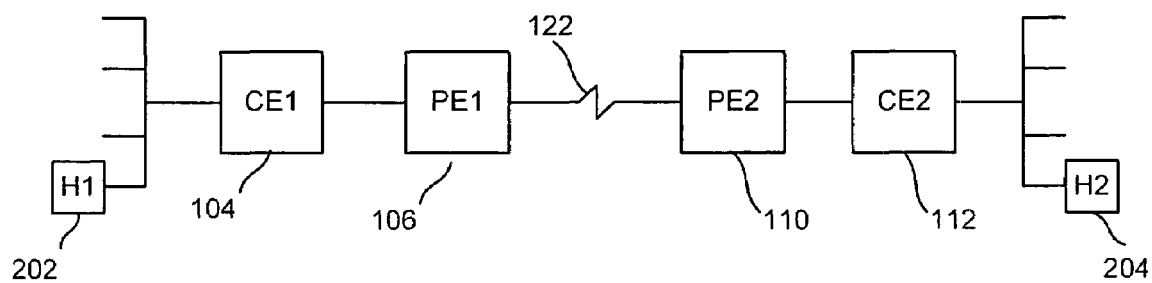
FIG. 2 is a block diagram illustrating an embodiment of a system for providing IP connectivity to a remote Ethernet host.

FIG. 2 is a block diagram illustrating an embodiment of a system for providing IP connectivity to a remote Ethernet host. A sending host "H1" (202) desiring to send an IP packet to a remote host "H2" (204) sends the packet via a customer edge device "CE1" (104), e.g., a switch or router located at the customer premises, to a provider edge router "PE1" (106). In some embodiments, CE1 (104) is a switch and host H1 (202) determines that PE1 (106) is the IP next hop to send an IP packet to host H2 (204), sends the IP packet intended for host H2 (204) via Ethernet addressed to a MAC address associated with PE1 (106), which Ethernet frame gets switched by CE1 (104) to PE1 (106). In some embodiments, CE1 (104) is a router and host H1 (202) determines that CE1 (104) is the IP next hop to send an IP packet to host H2 (204), sends the IP packet intended for host H2 (204) via Ethernet addressed to a MAC address associated with CE1 (104), which routes the IP packet to PE1 (106) (e.g., based on a determination that PE1 (106) is the IP next hop to forward from CE1 (104) an IP packet addressed to an IP address associated with host H2 (204)). PE1 (106) associates the received packet with a routing context, as described more fully below, and forwards the packet to PE2 (110) via Ethernet pseudo-wire 122 as an encapsulated Ethernet frame. PE2 (110) infers, based on a VC label included by PE1 (106) in an MPLS header used to encapsulate the Ethernet frame, an outbound port via which the Ethernet frame is to be sent, and sends the Ethernet frame via the outbound port to CE2 (112), which switches the Ethernet frame or further routes the IP packet payload of the Ethernet frame, as appropriate, to host H2 (204). Note that host H2 (204) may be either the ultimate/final destination of the IP packet or an IP next hop configured to further bridge/route the IP packet to its final destination.

Figure 3:
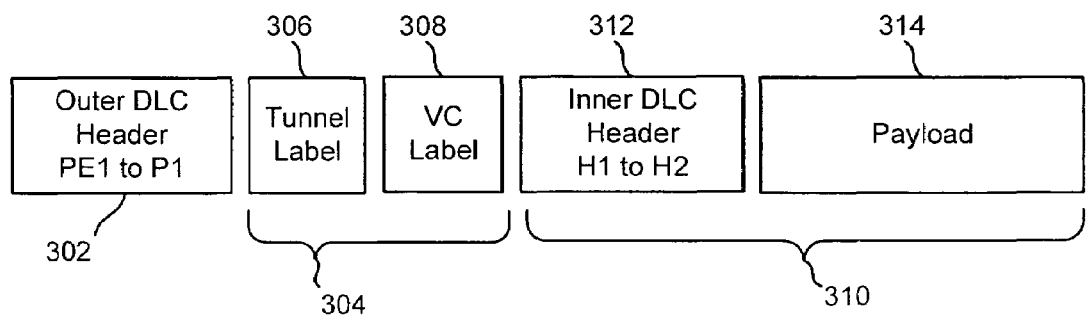
FIG. 3 is a block diagram illustrating an embodiment of a packet used to encapsulate and transport an Ethernet or other frame via an Ethernet pseudo-wire.
Figure 6:
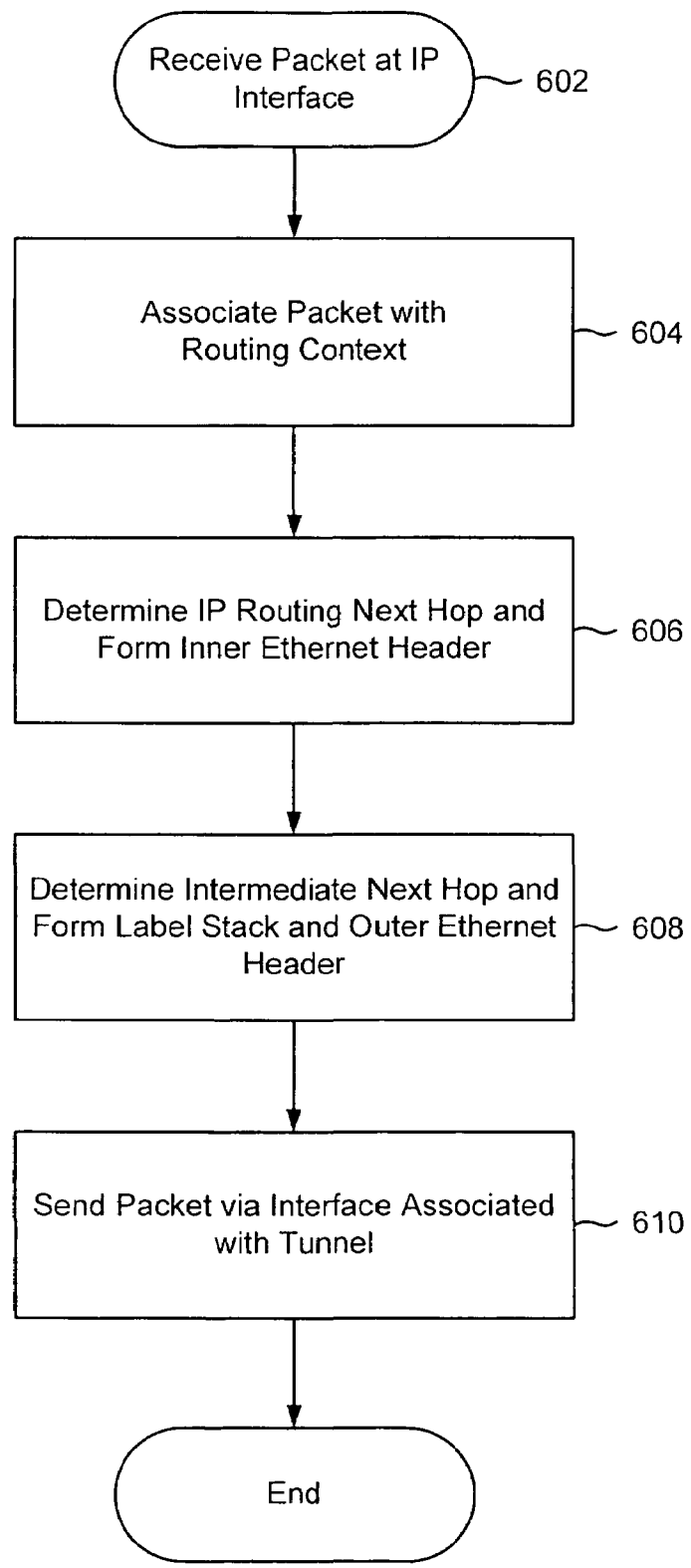
FIG. 6 is a flow chart illustrating an embodiment of a process for providing IP connectivity to a remote Ethernet host.
Figure 7:
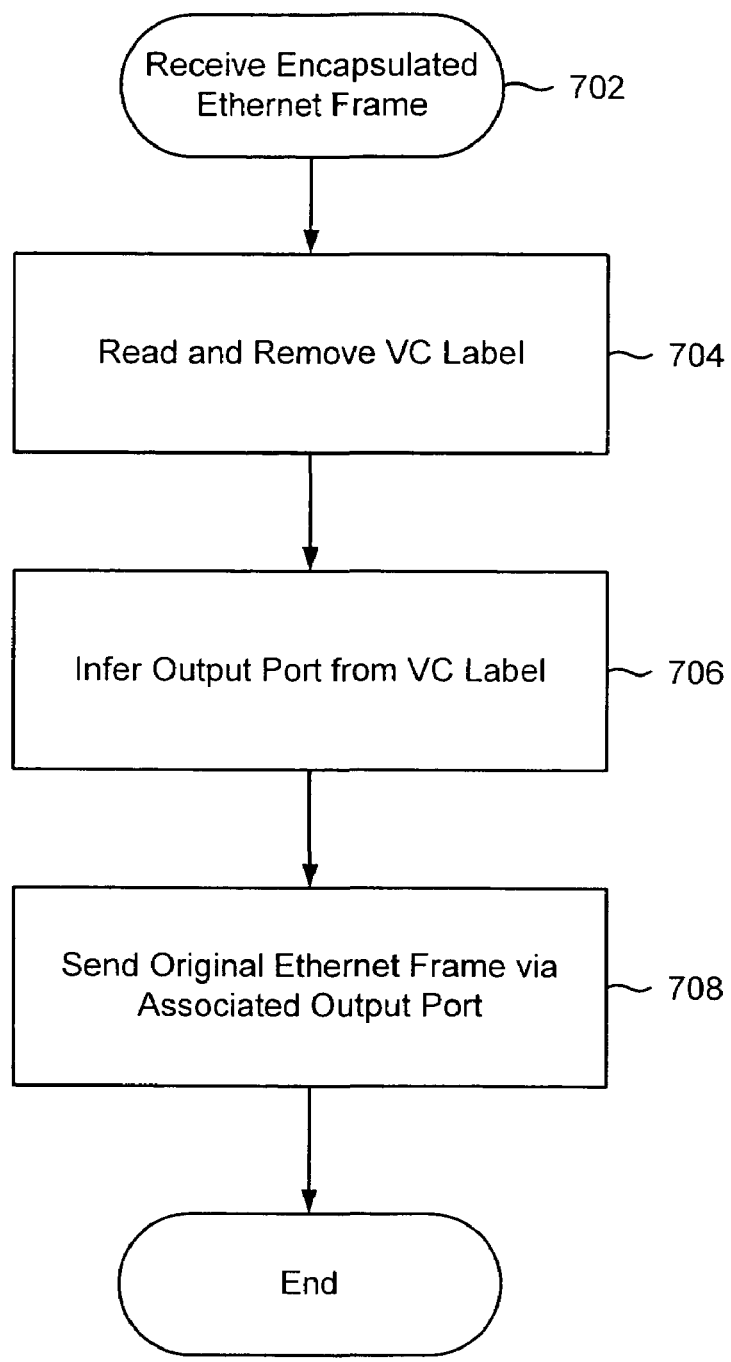
FIG. 7 is a flow chart illustrating an embodiment of a process for receiving via a pseudo-wire and processing an encapsulated Ethernet frame.

FIG. 3 is a block diagram illustrating an embodiment of a packet used to encapsulate and transport an Ethernet or other frame via an Ethernet pseudo-wire. In some embodiments, the packet shown in FIG. 3 is used to tunnel an encapsulated Ethernet packet via a pseudo-wire provided using an MPLS-based LSP, such as the pseudo-wire 122 of FIGS. 1 and 2. In the example shown, and MPLS label stack 304 has been added to encapsulate and original Ethernet (or other) frame 310. The MPLS label stack includes a tunnel label 306 that identifies an LSP to be used to tunnel the packet to a far end PE associated with a destination indicated by an inner data link control (DLC) header 312—e.g., an Ethernet DLC header including a destination MAC address, source MAC address, Ethernet type, and/or other information—included in original Ethernet frame 310. Ethernet frame 310 includes a payload 314, e.g., an IP packet for which the destination MAC address indicated in inner DLC header 312 is the IP routing next hop. In the example shown, inner DLC header 312 indicates a destination MAC address associated with host H2 (204) of FIG. 2 and a source MAC address associated with host H1 (202) of FIG. 2. MPLS label stack 304 also includes a VC label 308 that identifies a virtual circuit provisioned to tunnel through the LSP associated with tunnel label 306 traffic associated with hosts H1 (202) and H2 (204), e.g., for a customer with which the two hosts are associated. As described above, in some embodiments the VC label 308 is used at the far end PE to infer an outbound port via which to send the original Ethernet frame 310. Finally, the packet of FIG. 3 includes an outer DLC header 302 required to send the packet via an Ethernet (or other layer 2) connection between the ingress PE (PE1 in this example) to an intermediate next hop associated with the LSP associated with the tunnel label 306, core router "P1" in this example. Forming the inner DLC header 312 and the intermediate next hop header portions, in this example MPLS (or other tunneling) label stack 304 and outer DLC header 302, in a single forwarding process at PE ingress, as described more fully below in connection with FIGS. 5-7, is disclosed.

Figure 4A:
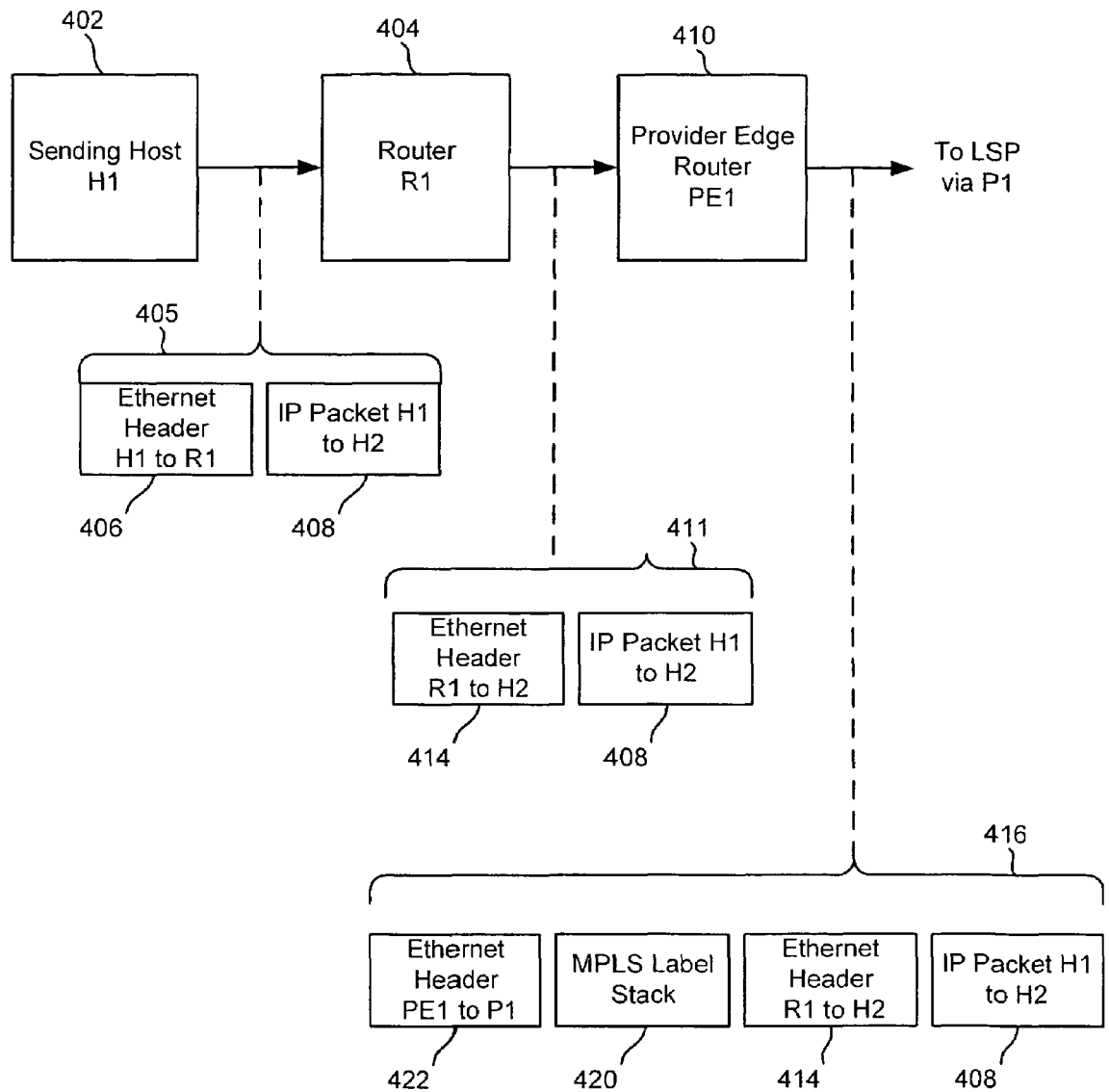
FIG. 4A is a block diagram illustrating a prior art approach to providing IP connectivity to a remote Ethernet host.

FIG. 4A is a block diagram illustrating a prior art approach to providing IP connectivity to a remote Ethernet host. A sending host H1 (402) desiring to send an IP packet to a remote host H2 (not shown in FIG. 4A, see, e.g., FIG. 2) determines that its IP routing next hop for host H2 is a router R1 (404), to which it forwards the IP packet to H2 (408) via an Ethernet frame (405) addressed to router R1 in a header portion (406) of the Ethernet frame. The router R1 (404) determines, e.g., based on a destination IP address associated with the IP packet (408), that the host H2 is a remote host to which IP connectivity is provided via an Ethernet pseudo-wire, forms an inner Ethernet header 414 to be used at the far end to route the IP packet 408 to the IP routing next hop on the far end, and forwards the Ethernet frame to be sent to the far end (414 and 408) via an Ethernet frame (411) sent from the router R1 (404) to a provider edge router PE1 (410) associated with the remote host H2 (e.g., by virtue of being associated with an LSP tunnel and/or virtual circuit with which host H2 is associated). The provider edge router PE1 (410) associates the received Ethernet frame with an LSP tunnel/VC, e.g., based on the physical interface (port) on which it was received, and encapsulates the Ethernet frame desired to be sent to the far end (sometimes referred to herein as the "original" Ethernet frame) (414 and 408) to form a packet 416 that includes an MPLS label stack (420) that identifies the LSP tunnel and VC circuit via which the packet is to be sent and an outer Ethernet header (422) to send the packet by Ethernet from the provider edge router PE1 (410) to a first hop core router P1 (not shown in FIG. 4A) along the LSP tunnel. As one can see from FIG. 4A and the above description, the approach illustrated in FIG. 4A requires a separate router R1 to determine the IP routing next hop information that will be required to process the frame at the far end, and a network transmission from the router R1 to the provider edge router PE1, which determines the intermediate (tunnel/VC) next hop information.

Figure 4B:
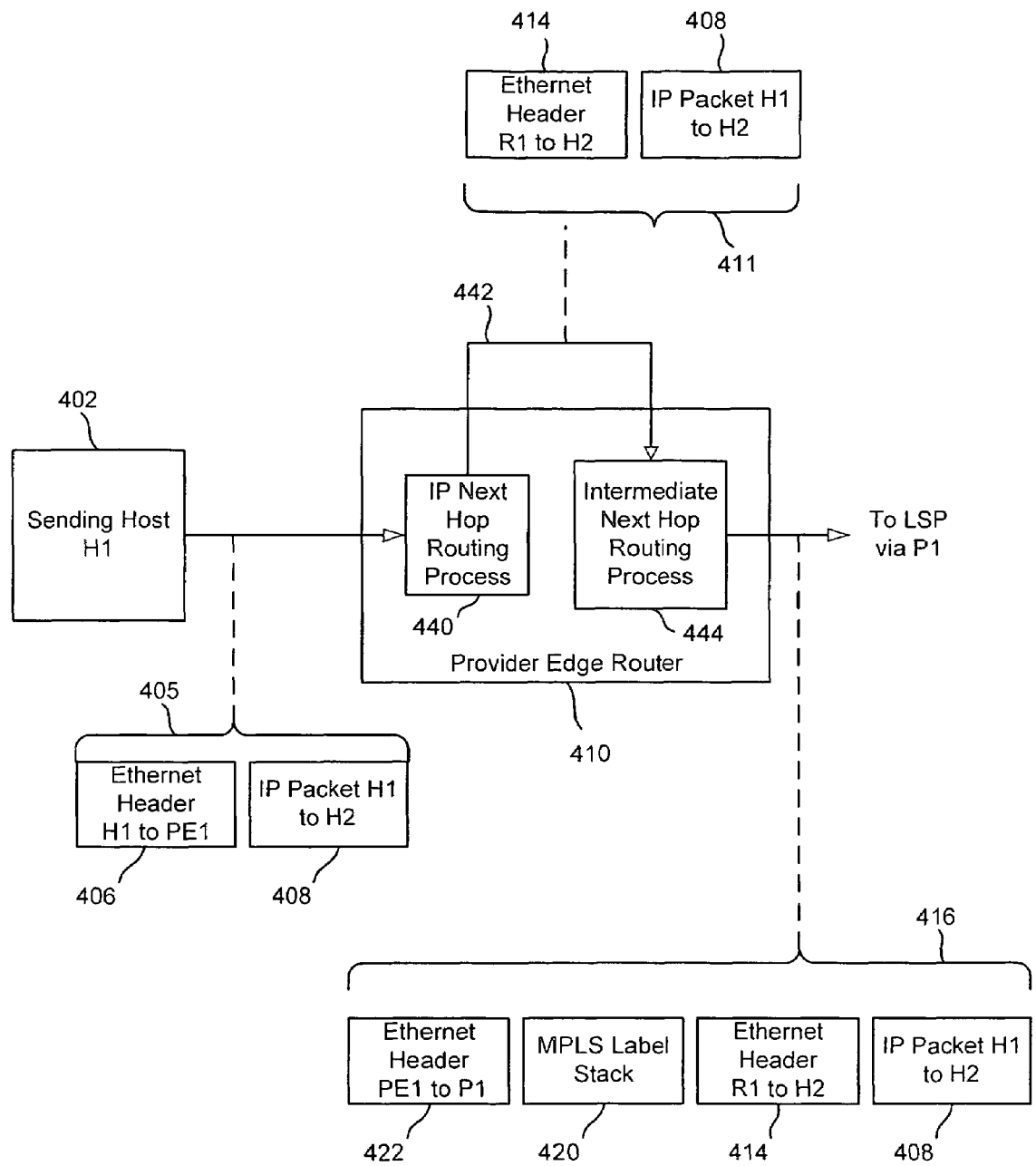
FIG. 4B is a block diagram illustrating a prior art approach to providing IP connectivity to a remote Ethernet host.

FIG. 4B is a block diagram illustrating a prior art approach to providing IP connectivity to a remote Ethernet host. In the approach shown in FIG. 4B, the functions of the router R1 (404) have been incorporated into the provider edge router PE1 (410) in the form of an IP next hop routing process (440) running on the provider edge router PE1 (410), eliminating the need for a separate system to perform the functions of router R1 (404) as described above. However, an external network connection (442) between the IP next hop routing process (440) and an intermediate next hop routing process (444) running on the same system (i.e., PE1) is still required to enable the IP next hop routing process (440) to send the Ethernet frame (411) to the intermediate next hop routing process (444) in a manner that enables the intermediate next hop routing process (444) to associate the frame (411) with the correct routing context (e.g., to identify the tunnel/VC via which the original Ethernet frame is to be transported.

Figure 5A:
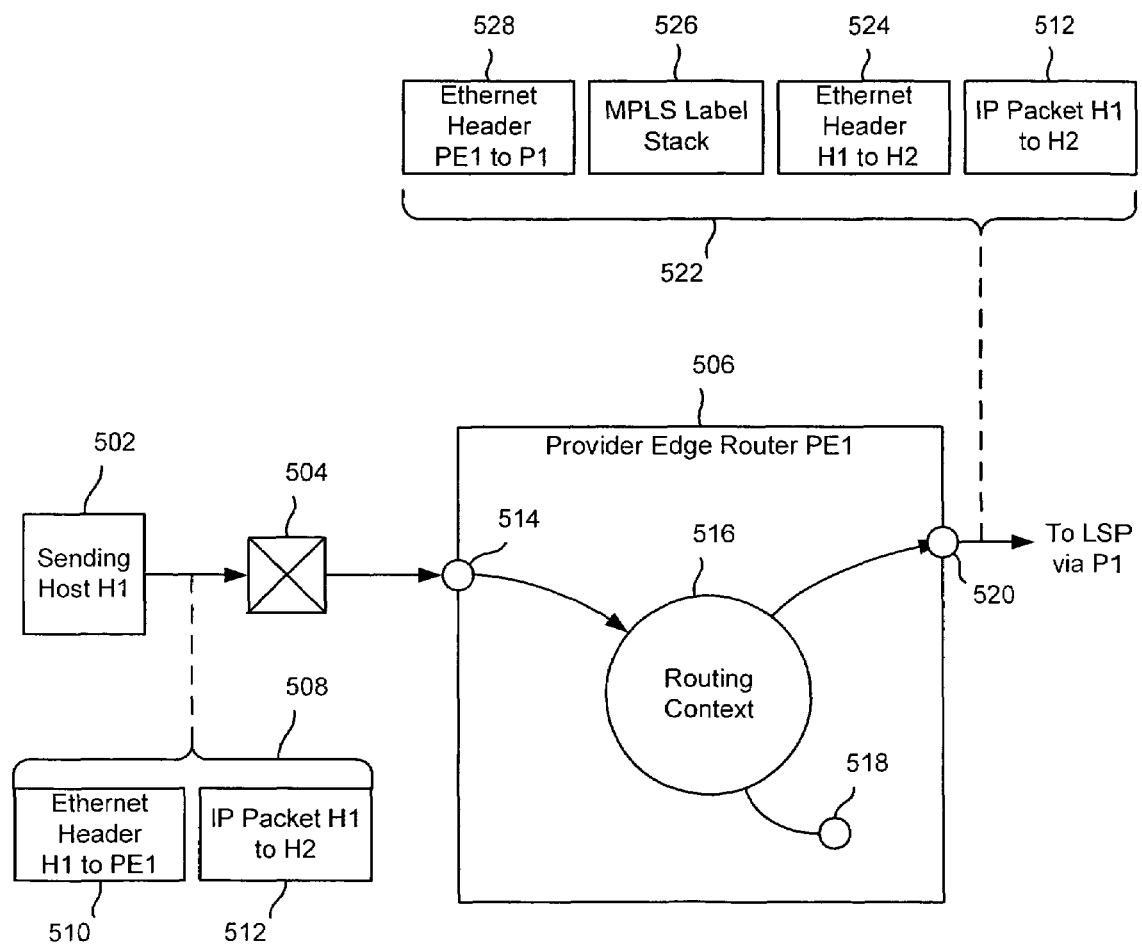
FIG. 5A is a block diagram illustrating an embodiment of an approach to providing IP connectivity to a remote Ethernet host using a single forwarding stage.

FIG. 5A is a block diagram illustrating an embodiment of an approach to providing IP connectivity to a remote Ethernet host using a single forwarding stage. In the approach illustrated in FIG. 5, the IP routing next hop and the intermediate (tunnel/VC) next hop information are determined in a single forwarding stage, eliminating the need for a separate external network connection and transmission between an IP routing system/process and the system/process (e.g., PE) that determines the intermediate next hop for transport via the MPLS (or other) backbone. In the example shown, sending host H1 (502) forwards an IP packet (512) addressed to a remote Ethernet host H2 to a provider edge router PE1 (506) via an Ethernet frame (508, having an Ethernet header 510) sent to PE1 (506), in this example via a switch (504). In the example shown, the packet 508 is sent by host H1 (502) via the switch (504) to an IP interface 514 at provider edge router PE1 (506). The provider edge router (506) associates the packet (508) with a routing context (516) based at least in part on the interface (514) via which the packet (508) arrived at the provider edge router. The routing context (518) is provided at least in part by configuring a virtual IP interface (518) and associating IP interface (514) with the virtual IP interface (518). In some embodiments, the routing context (516) comprises one or more routing processes and associated data (e.g., forwarding information bases, routing tables, etc.). In this example, the routing context (516) is configured to determine in a single forwarding stage, based at least in part on IP header information contained in a received IP packet that has been associated with the routing context (516), such as packet (508) in the example shown, both the IP routing next hop information that will be required to deliver the IP packet to its next hop at the far end without requiring that an IP routing decision be made at the far end and the intermediate next hop information required to tunnel the packet to the far end via an associated pseudo-wire. In the example shown, the provider edge router PE1 (506) uses the IP next hop routing information to form the inner Ethernet header (524) of outbound packet (522) and the intermediate next hop routing information to form label stack (526) and outer Ethernet header (528) of outbound packet (522), which the provider edge router PE1 (506) send to the LSP tunnel/VC next hop (provider core router P1 in this example, not shown in FIG. 5A) via an interface (520).

Figure 5B:
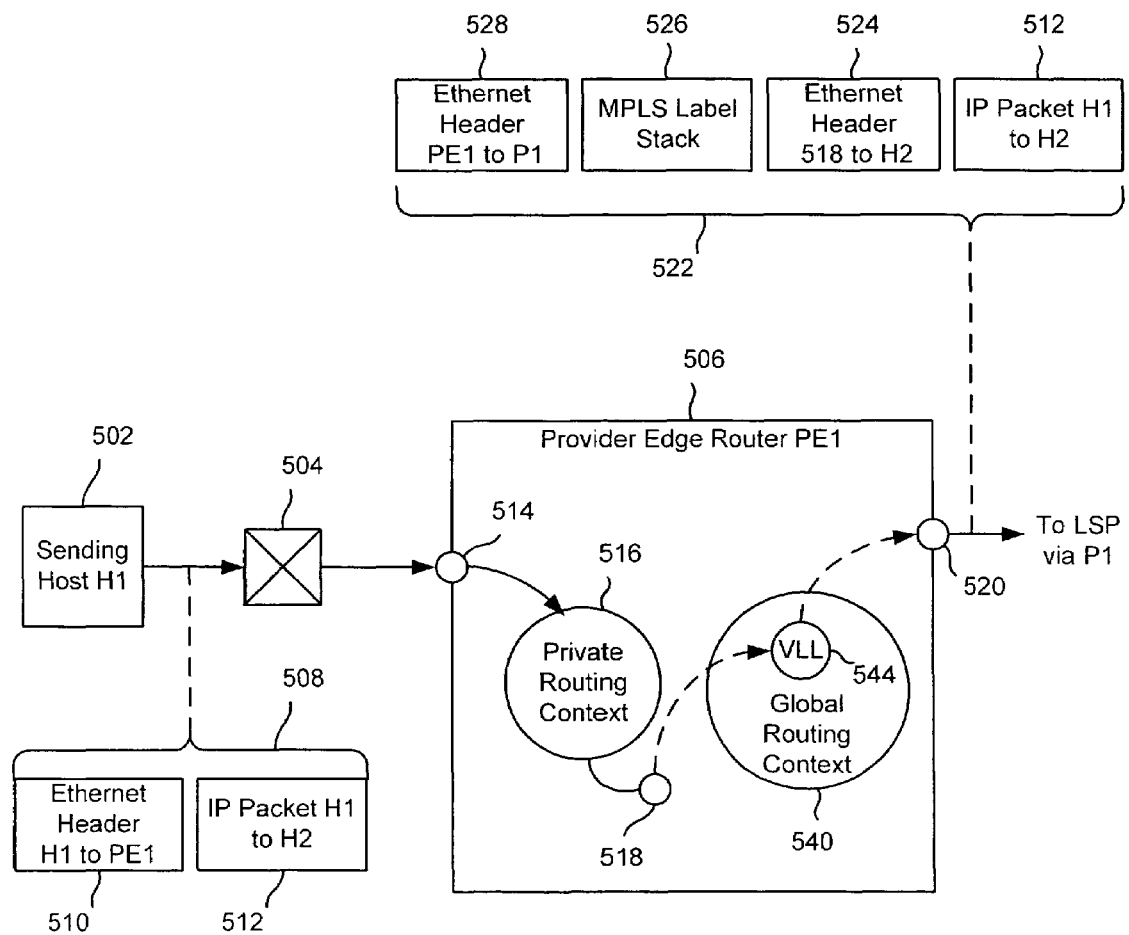
FIG. 5B is a block diagram illustrating an embodiment of an approach to providing IP connectivity to a remote Ethernet host using a single forwarding stage.

FIG. 5B is a block diagram illustrating an embodiment of an approach to providing IP connectivity to a remote Ethernet host using a single forwarding stage. In this example, the routing context (516) of FIG. 5A comprises a private routing context (516) configured to determine the IP next hop information required to route the packet at the far end. The packet received at IP interface (514) is associated within private routing context (516) with virtual IP interface (518). The packet is determined to be is associated with a VLL (544) within a global routing context (540), which determines the intermediate next hop information for the outer Ethernet header (528) and MPLS label stack (526) portions of outbound packet (522) required to send the frame to the far end via interface (520) and the associated pseudo-wire.

FIG. 6 is a flow chart illustrating an embodiment of a process for providing IP connectivity to a remote Ethernet host. In some embodiments, the process of FIG. 6 is implemented by an ingress provider edge router such as PE1 (506) of FIG. 5. An IP packet is received at an IP interface (602). The packet is associated with a routing context (604). In some embodiments, the packet is associated with a routing context based at least in part on the physical and/or logical interface at which it was received. An IP routing next hop information is determined and used to form an inner Ethernet header required to enable a far end provider edge router (i.e., one at the other end of a tunnel from the ingress PE to the far end PE) and/or other elements at the far end to deliver the IP packet to its IP routing next hop on the far end without making at the far end an IP routing decision for the packet (606). Intermediate next hop information required to forward the packet to the far end via an associated Ethernet pseudo-wire is determined and used to form an MPLS (or other) label stack (e.g., 526 of FIG. 5) and outer Ethernet header (e.g., 528 of FIG. 5). The packet formed (606 and 608) is sent to the intermediate next hop (e.g., a next hop provider core router, such as P1 in the example shown in FIGS. 1A and 5) via an interface associated with the LSP/tunnel used to provide the pseudo-wire. In some embodiments, the process of FIG. 6 comprises a single forwarding stage provided and performed at a provider edge router. In some embodiments, different information sources (e.g., forwarding/routing tables) are used to determine the IP routing next hop and intermediate (tunnel/VC) next hop, respectively, but the determinations are made as part of a single forward process, within one physical system, and without requiring two separate routing systems and/or processes to communicate via an external network connection.

FIG. 7 is a flow chart illustrating an embodiment of a process for receiving via a pseudo-wire and processing an encapsulated Ethernet frame. In some embodiments, the process of FIG. 7 is implemented by a far end (egress) provider edge router, such as PE2 in the example shown in FIGS. 1A-2. An encapsulated Ethernet frame is received (702). A VC label included in a label stack used to encapsulate the received frame in read and removed (704). An output port via which the original Ethernet frame encapsulated within the encapsulated Ethernet frame is inferred based at least in part on the VC label (706). The original Ethernet frame is sent via the output port inferred at 706 (708). In some embodiments, the original Ethernet frame includes an inner Ethernet header, such as inner Ethernet header 524 of FIG. 5, that enables the original Ethernet frame to be received and processed at an IP routing next hop for an IP packet that comprises the payload of the original Ethernet frame, without an IP routing decision being made at the end at which the encapsulate Ethernet frame was received at 702.

While a number of the examples and embodiments described herein refer to providing IP connectivity to a remote Ethernet host, the approaches disclosed herein may be used to provide connectivity to remote host using any compatible network and/or physical layer protocols.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method of providing connectivity to a remote host, comprising:
   receiving at an interface among a plurality of interfaces a packet including an address associated with a remote host;
   determining in a single forwarding stage within one physical system and without requiring communication via an external network connection, based at least in part on the interface and the address, an IP routing next hop information required to route the packet to the remote host at a far end of a pseudo-wire via which connectivity to the remote host is provided and an intermediate next hop information required to send the packet to the far end via the pseudo-wire;
   wherein determining based on the interface and the address includes forming an inner Ethernet header of the packet using the IP routing next hop information and forming a label stack and an outer Ethernet header of the packet using the intermediate next hop routing information.

2. A method as recited in claim 1, wherein the packet comprises an IP packet.

3. A method as recited in claim 1, wherein the address comprises an IP addressed associated with the remote host.

4. A method as recited in claim 1, further comprising using the IP routing next hop information to form a header required to provide the packet to the remote host at the far end of the pseudo-wire without making at the far end an IP routing decision based on the address.

5. A method as recited in claim 1, wherein the interface comprises an IP interface.

6. A method as recited in claim 1, wherein the packet is received from a customer equipment associated with a customer with which a sending host that sent the packet is associated.

7. A method as recited in claim 1, wherein the pseudo-wire comprises an Ethernet pseudo-wire.

8. A method as recited in claim 1, wherein the pseudo-wire comprises a virtual circuit.

9. A method as recited in claim 8, wherein the intermediate next hop information includes a virtual circuit information associated with the virtual circuit.

10. A method as recited in claim 8, wherein the virtual circuit is associated with a label switched path (LSP).

11. A method as recited in claim 10, wherein intermediate next hop information includes a tunnel label associated with the LSP.

12. A method as recited in claim 10, wherein the LSP comprises a tunnel through an MPLS backbone.

13. A method as recited in claim 12, further comprising forming a label stack based at least in part on the intermediate next hop information.

14. A method as recited in claim 13, wherein the label stack includes the tunnel label.

15. A method as recited in claim 13, wherein the virtual circuit information comprises a virtual circuit label and the label stack includes the virtual circuit label.

16. A method as recited in claim 1, wherein the remote host comprises a remote Ethernet host.

17. A method as recited in claim 1, wherein the intermediate next hop information includes information required to form a data link control layer header required to send the packet to an intermediate next hop associated with the pseudo-wire.

18. A method as recited in claim 1, further comprising using the routing next hop information and the intermediate next hop information to form an outbound packet comprising an encapsulation of an Ethernet frame of which the received packet comprises the payload.

19. A provider edge device, comprising:
   an interface among a plurality of interfaces configured to receive a packet including an address associated with a remote host; and
   a processor coupled to the interface and configured to determine in a single forwarding stage within one physical system and without requiring communication via an external network connection, based at least in part on the interface and the address, an IP routing next hop information required to route the packet to the remote host at a far end of a pseudo-wire via which connectivity to the remote host is provided and an intermediate next hop information required to send the packet to the far end via the pseudo-wire;
   wherein determining based on the interface and the address includes forming an inner Ethernet header of the packet using the IP routing next hop information and forming a label stack and an outer Ethernet header of the packet using the intermediate next hop routing information.

20. A computer program product for providing connectivity to a remote host, the computer program product being embodied in a computer readable storage medium and comprising computer instructions for:
   receiving at an interface among a plurality of interfaces a packet including an address associated with a remote host;
   determining in a single forwarding stage within one physical system and without requiring communication via an external network connection, based at least in part the interface and the address, an IP routing next hop information required to route the packet to the remote host at a far end of a pseudo-wire via which connectivity to the remote host is provided and an intermediate next hop information required to send the packet to the far end via the pseudo-wire;
   wherein determining based on the interface and the address includes forming an inner Ethernet header of the packet using the IP routing next hop information and forming a label stack and an outer Ethernet header of the packet using the intermediate next hop routine information.

* * * * *

UNITED STATES PATENT AND TRADEMARK OFFICE
CERTIFICATE OF CORRECTION

PATENT NO.       : 7,613,188 B1                                                         Page 1 of 1
APPLICATION NO.  : 11/414726
DATED            : November 3, 2009
INVENTOR(S)      : French et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 514 days.

Signed and Sealed this

Nineteenth Day of October, 2010

David J. Kappos
*Director of the United States Patent and Trademark Office*